United States Patent [19]

DiMatteo et al.

[11] 4,135,190
[45] Jan. 16, 1979

[54] NAVIGATIONAL PLOTTER

[75] Inventors: Paul DiMatteo, Huntington; Joseph A. Ross, Fort Salonga; John P. Whiteman, Seaford, all of N.Y.

[73] Assignee: Solid Photography Inc., Melville, N.Y.

[21] Appl. No.: 727,637

[22] Filed: Sep. 29, 1976

[51] Int. Cl.² .................... G01S 1/30; G08B 5/22; G01D 9/00
[52] U.S. Cl. ................ 434/105 R; 340/24; 343/103; 343/112 PT; 346/136
[58] Field of Search ........... 343/103, 105 R, 112 PT; 346/8, 136; 235/150, 272; 340/24

[56] References Cited

U.S. PATENT DOCUMENTS

| | | | |
|---|---|---|---|
| 3,225,350 | 12/1965 | Fernandez | 343/112 PT |
| 3,293,599 | 12/1966 | Nay et al. | 346/8 R |
| 3,535,789 | 10/1970 | Roberts | 343/105 R |
| 4,053,893 | 10/1977 | Boyer | 340/24 X |

*Primary Examiner*—Maynard R. Wilbur
*Assistant Examiner*—Richard E. Berger
*Attorney, Agent, or Firm*—Max Fogiel

[57] ABSTRACT

A navigational plotter in which a geographical map or chart has marked thereon lines of position corresponding to the Omega or Loran navigation system aids, for example. The intersections of the lines of position with a base line on the chart are recorded in coded form on a separate strip of the chart. The coded signals on the chart strip are read out by the plotter, so that the position of the marker or indicator of the plotter may be read out directly in terms of lines of position corresponding to Omega or Loran systems. The marker or indicator of the plotter may also be positioned directly from information obtained in terms of Omega or Loran lines of position.

13 Claims, 19 Drawing Figures

NAVIGATIONAL PLOTTER

BACKGROUND OF THE INVENTION

Plotters used for navigational purposes in the prior art, are comprised substantially of a marker or indicator which is displaced along a rectangular set of coordinates x - y, in accordance with the motion or displacement of the vehicle which is traced by the plotter.

To operate these plotters, heretofore, positional information is supplied to the plotter in the form of x - y coordinates for displacing the marker or indicator correspondingly along the rectangular axes of the plotter. Furthermore, the position of the marker or indicator of the plotter, or any point on the trace plotted, is read out from the plotter in terms of x - y coordinates.

In determining the geographical position of a vehicle such as an aircraft during flight, for example, navigational system aids are often used such as Omega or Loran. By communicating with predetermined Omega or Loran stations, the navigator of the aircraft may obtain lines of position which intersect at a point corresponding to the geographical position of the aircraft. After receiving the aircraft's position in terms of Omega or Loran lines of position, the navigator is generally required to convert or translate these lines of position in corresponding x - y coordinates compatible with the form of information acceptable by the plotter. Such conversion of coordinates by the navigator is a tedious and time consuming process, and considerably subject to human error. At the same time, if the conversion of coordinates is carried out with the aid of computers which are connected directly to the plotter for the purpose of reducing the computational time and errors, the interconnection and linkages which are required, are complex, and the computer is required to solve involved equations. As a result, a special purpose navigational computer carried aboard an aircraft for this purpose of providing the conversion among coordinates, is complex in design, costly, and constitutes substantially large and heavy equipment.

Accordingly, it is an object of the present invention to provide a navigational plotter capable of accepting geographical position information directly in terms of Omega or Loran lines of position, and displaying the information on a chart which has x - y coordinates.

Another object of the present invention is to provide a navigational plotter in which the location of a point may be defined in terms of x - y coordinates on a chart, and this location of the point may be read out of the plotter in terms of Omega or Loran systems.

A further object of the present invention is to provide a navigational plotter of the foregoing character which may be operated manually and in conjunction with navigational computers as, for example, dead reckoning computers.

It is a particular object of the present invention to provide a plotter, as described, which is simple in design, particularly accessible for maintenance, and may be manufactured economically.

SUMMARY OF THE INVENTION

The objects of the present invention are achieved by providing a navigational plotter in which a geographical map or chart is wound and unwound on spools in the plotter. Transport or movement of the chart between the spools constitutes travel in the x direction, for example. Travel in the y direction is provided by a marker or indicator movable in the y direction on a threaded rod.

The geographical chart is provided with a strip running along substantially the length of the chart and carrying coded information with respect to the Omega or Loran lines of position with a predetermined base line on the chart. Sensors in the plotter read the coded information on the strip and provide signals directly representative of the aforementioned lines of position.

The plotter may be set manually from information obtained directly from an Omega or Loran receiver, and may continue to operate in conjunction with a dead reckoning computer, for example, to trace the flight path of the aircraft. Conversely, the instantaneous position of the aircraft as traced by the plotter, may be obtained directly in terms of Omega or Loran lines of position as read by the sensors. Both modes of operation require considerably less involved calculations than heretofore, as a result of the coded information on the chart.

The chart, in accordance with the present invention, is also arranged so that frames following in succession along the axis of transport of the chart, can represent geographical areas normally lying along the transverse axis perpendicular to the path of travel of the chart.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3a shows a family of principal lines of position obtained when communicating with one pair of Omega or Loran stations, and FIG. 3b shows another family of principal lines of position when communicating with another pair of such stations;

DESCRIPTION OF THE PREFERRED EMBODIMENTS

Figure 1:
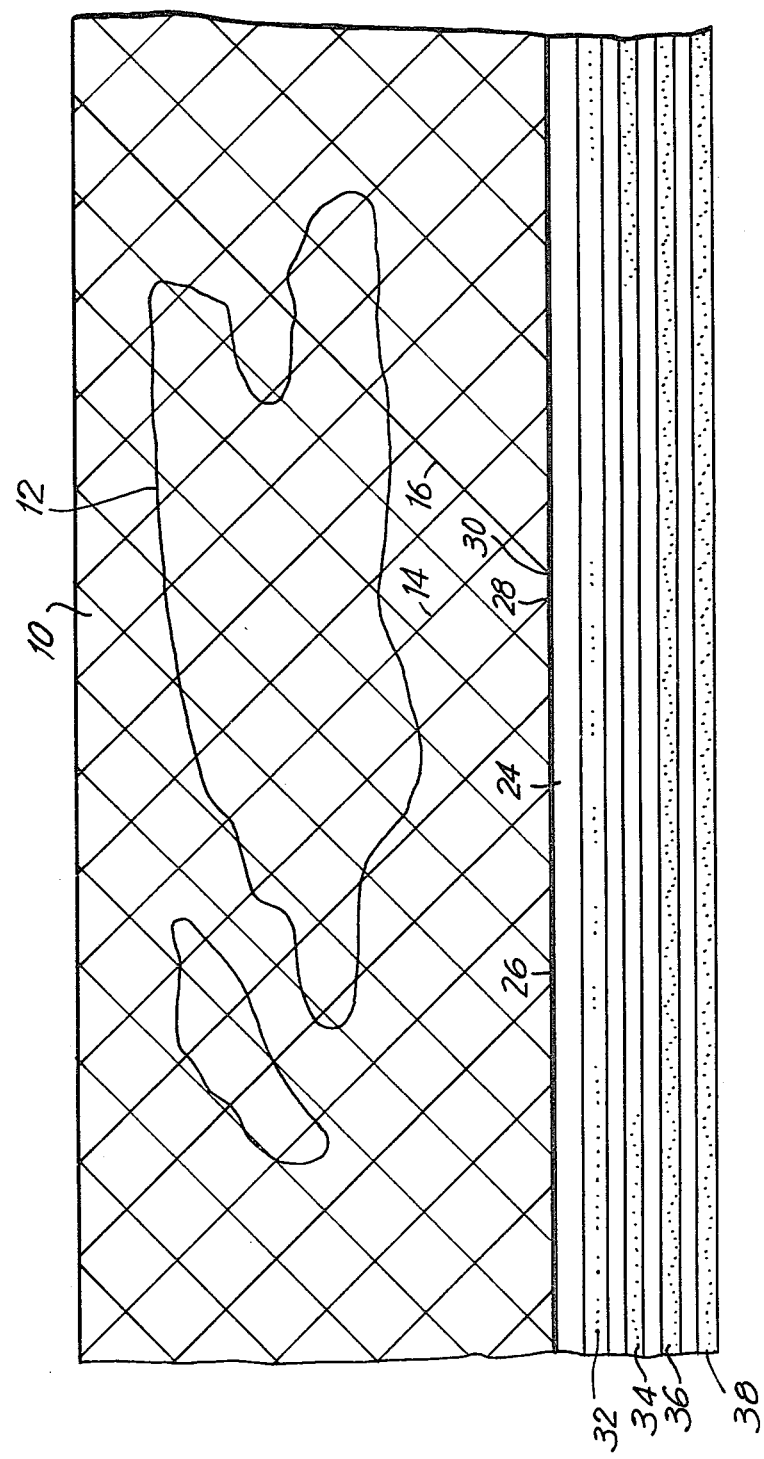
FIG. 1 is a plan view of the chart or map in the plotter of the present invention.

Referring to the drawing and in particular to FIG. 1, there is shown a typical section of a rolled or strip chart or map used in the plotter of the present invention. This map or chart 10 carries topographical lines of information 12 giving geographical outlines.

Marked directly on the chart 10, are a series of parallel lines 14 representing some lines of position obtained when receiving and tracking with a predetermined set of Omega or Loran stations. A second series of parallel lines 16, also marked on the chart 10, represent some other lines of position when communicating with another set of predetermined stations of the Omega or Loran systems.

Figure 2:
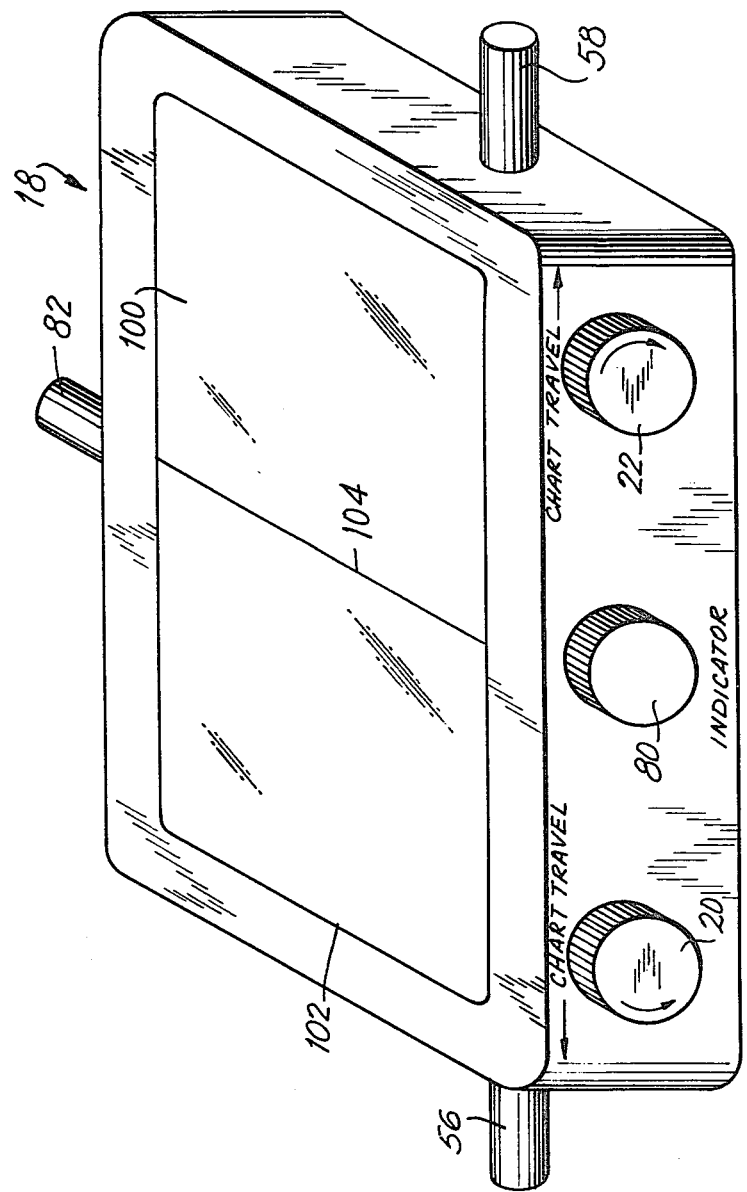
FIG. 2 is a perspective view of the plotter and shows the manual controls for setting the plotter, as well as the means for connecting the plotter to navigational computers.

The chart or map 10 is rolled or wound on spools within the plotter 18 shown in FIG. 2. By rotating the manual control knob 20 on the outside of the plotter housing, the chart or map 10 may be transported or moved to the left. Rotation of the knob 22, on the other hand, causes displacement of the chart 10 to the right. Thus, the chart 10 is in rolled form or elongated strip suitable for winding onto spools in the plotter.

Figure 3:
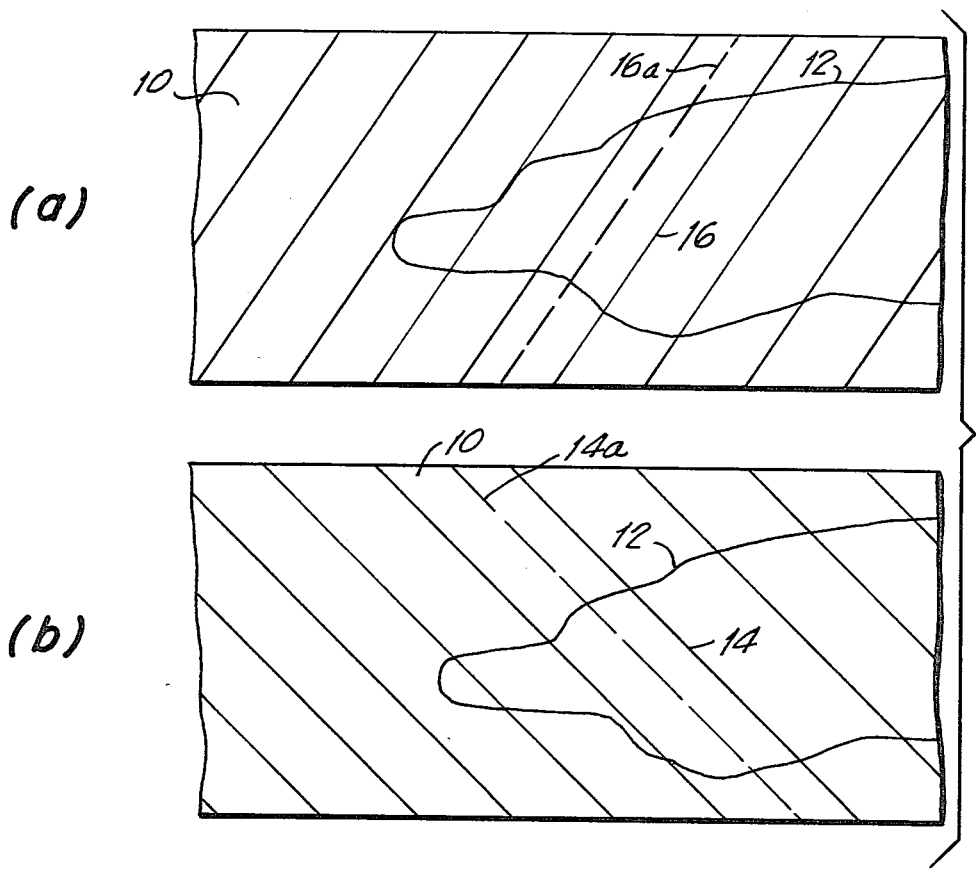
FIG. 3 is a plan view of a portion of the map or chart with lines of position marked thereon, as obtained from predetermined Omega or Loran stations.

The manner in which lines of position 14 and 16 are obtained, may be more clearly seen from FIG. 3. When communication is established between the aircraft or vessel carrying the plotter of the present invention, and a predetermined pair of Omega or Loran stations, a line of position 16a (FIG. 3a) is obtained parallel to the principal lines 16, usually referred to as lanes in the art. Another line of position 14a parallel to another family of principal lines 14 is obtained, when communicating with another pair of Omega or Loran stations. This is shown in FIG. 3b. By super-imposing the configuration of FIG. 3b upon FIG. 3a, intersecting lines are obtained, as shown in FIG. 1.

Running along the lengthwise border of the chart 10, is a strip portion 24 which carries information on the intersections of the families of lines 14 and 16 with the base line 26, for example.

Thus, a typical line 14 intersects the base line 26 at a point 28. Similarly, the line of position 16 intersects the base line 26 at the point 30. The point of intersection 28 is recorded on the strip 24, along a track of information 32. This track 32 carries data on the respective intersections of the family of lines 14 with the base 26. In a similar manner, the point of intersection 30 is recorded on a separate track 34, together with the other points of intersection of this parallel family of lines.

The recorded points of intersection on tracks 32 and 34 may be in coded or digital form, for example. The information may be recorded, furthermore, in the form of optically recognizable indentures such as the presence or absence of holes, transparent or opaque areas, or similar means. In another arrangement the tracks 32 and 34 may be in the form of magnetic tapes which store the recorded data magnetically, for example, in conventional form. The information on tracks 32 and 34, furthermore, may also be recorded by means of magnetic ink for example.

Depending on the time of day, the year and other environmental conditions, corrections should be applied to the lines of position 14 and 16, in order to obtain accurate position data. These corrections are published in the form of diurnal tables generally acceptable to navigators. The data from these tables may be recorded on tracks 36 and 38, so that track 36, for example, carries the corrections to be applied to lines of position 14, whereas track 38 carries corrections applicable to lines of position 16. When the recording tracks 36 and 38 are in the form of magnetic tape, for example, the information recorded on these tracks can be easily changed and updated in accordance with the published data. The coding and manner of recording the information on tracks 36 and 38 may be made similar to that described above in relation to tracks 32 and 34.

Figure 6:
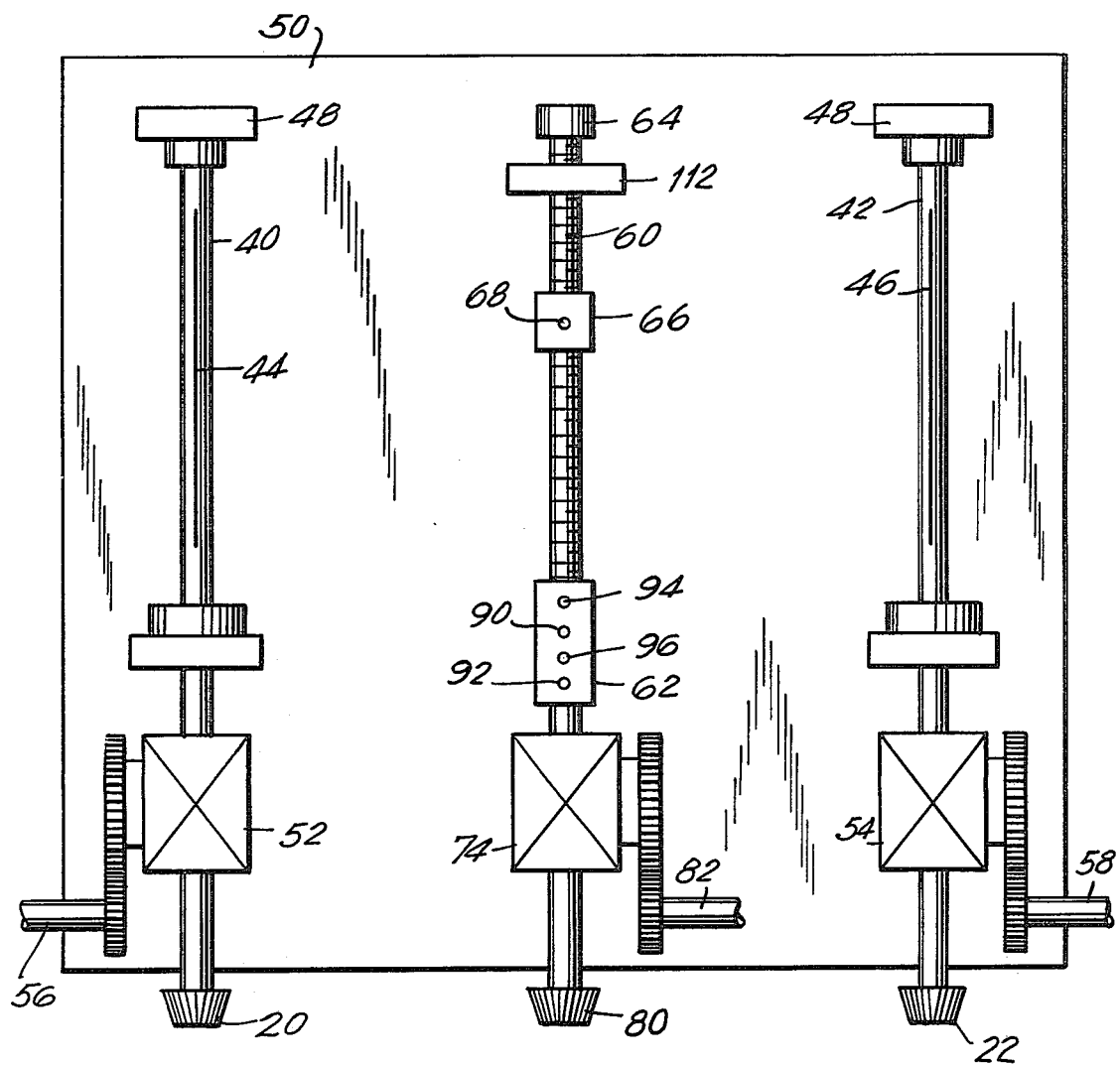
FIG. 6 is a schematic view of the internal mechanical linkages of the plotter, in accordance with the present invention.

Referring now to FIG. 6, the ends of the chart 10 are wound on two spools 40 and 42. To facilitate the winding of the chart on these spools, the latter are provided with slots 44 and 46, respectively. Thus, the slot 44, for example, allows the end of the chart 10 to be inserted therein, and rotation of the spool 40 thereafter permits winding of the respective end of the chart onto the spool. The spools 40 and 42 are, in turn, rotatably mounted in bearings 48 attached to a base plate 50.

The spools 40 and 42, furthermore, are connected to outputs of mechanical differentials 52 and 54, respectively. One input of the differential 52, comprises a shaft turned by the rotatable knob 20 for winding the chart 10 onto the spool 40 manually, and thereby moving the chart 10 toward the left. The other input of the differential 52 is mechanically linked by means of the shaft 56, to a navigational computer, not shown. This navigational computer may be in the form of a dead reckoning computer, for example, which causes rotation of the spool 40 in accordance with the displacement of the aircraft in the x direction.

In a similar manner, one input of the differential 54 is connected to the rotatable knob 22 for rotating the spool 42 in a manner whereby the chart 10 is displaced towards the right. The second input of the differential 54 may be connected by means of a shaft 58 to the dead reckoning computer so that the spool 42 is rotated in the x direction opposite to that associated with the shaft 56 and spool 40.

To obtain the displacement of the indicator along the y direction, a lead screw 60 is mounted onto the base plate 50 by means of bearings 62 and 64. Upon rotation of the lead screw 60 within the bearing members 62 and 64, the holder 66 for a marker or indicator 68 is displaceable along the axis of the lead screw 60. Since the longitudinal axis of the lead screw 60 is perpendicular to the axis or path of travel of the chart 10 between the spools 42 and 44, the displacement of the marker or indicator 68 is normal to the path of travel or displacement of the chart.

One end of the lead screw 60 is connected to the output of a third differential 74. One input of this mechanical differential 74 may be manually positioned by means of a knob 80. Thus, by rotating the knob 80 manually which also appears on the outsides of the plotter housing as shown in FIG. 2, the marker or indicator 68 may be displaced along the axis of the lead screw 60. The other input to the differential 74 may be linked by means of shaft 82, to the y-displacement output of the navigational computer to which shafts 56 and 58 are connected for the x-displacement output. Two pairs of sensors 90,92 and 94,96 are mounted in the vicinity of the center line of lead screw 60 as shown in FIG. 6. Sensors 90,92 are arranged to read the information on tracks 34,38 on the strip portion 24 of chart 10, whereas sensors 94,96 read the information on tracks 32,36, respectively.

In operation of the present invention, the base plate 50 together with the components mounted thereon, is enclosed within the housing of the plotter shown in FIG. 2. A transparent glass or plastic sheet member 100 serves to cover a top opening 102 of the housing. The transparent sheet or pane 100 has marked thereon a line 104 which coincides with the longitudinal axis of the lead screw 60 (FIG. 6). Thus, the linear displacement of the marker or indicator 68 takes place along the line 104 marked on the pane 100. When the chart 10 is inserted in place and wound onto spools 40 and 42, the chart is directly beneath the pane 100 and is visible from the stop surface of the plotter. The components within the interior of the plotter are, thereby not visible when the chart 10 is in place. Shafts 56, 58 and 82 project from the housing of the plotter 18, and are adapted for connecting by suitable means, to a navigational computer, not shown.

To find the location of a point P on the chart 10, directly in Omega or Loran lines of position, the chart 10 is displaced along its axis of travel until the point P lies directly beneath the line 104 marked on the pane 100. This may be accomplished manually, for example, by rotating knobs 20 and 22. Thereafter, the marker or indicator 68 is displaced by rotating the knob 80, for example, until the indicator 68 lies directly beneath the point P. With the marker or indicator 68 positioned, in this manner, sensors 90 and 92 read the line of position 106. This line of position 106 is one of a family of parallel lines obtained from communication between the aircraft and a predetermined set of Omega or Loran stations, as previously discussed. The line 106 is identified by its intersection with the base line 26, and this intersection is recorded on the respective track of information on the strip 24 of the chart 10.

Sensors 94 and 96 read from their respective tracks the line of position 108 of family 14, and the corresponding diurnal correction which is to be applied. Since the sensors 94 and 96 read this line of position 108 instead of the line of position 110 which passes directly through the point P, it is necessary to carry out the following computation:

$$L\,110 = L\,108 + \overline{OP} \tan \theta$$

Where L 108 is the magnitude of line of position 108, L 110 is the magnitude of line of position 110, $\overline{OP}$ is the displacement of the indicator 68 with respect to the origin O, and $\tan \theta$ is the slope of the line of position 110 or 108, and is a known quantity. Thus, the slope of the family of lines 108 can be recorded directly onto its track on the strip 24 so that the above computation can be carried out. The magnitude $\overline{OP}$ is directly proportional to the displacement of the indicator 68, and this displacement is proportional to the amount of rotation of the lead screw 60. A signal representing the magnitude of such displacement of the indicator 68 may be obtained directly from a potentiometer 112, for example, which is displaced in accordance with the rotation of the lead screw 60. Thus, the potentiometer 112 provides a signal representing the magnitude of $\overline{OP}$. The computation can be carried out either manually or by the use of a computer. In the latter case, the signals from the sensors and the potentiometer may be applied directly to the computer for carrying out the computation. Similar computations may be carried out using data read by sensors 90 and 92 to arrive at the correct value of the line of position of point P in the other family of lines 16 of position.

Figure 7:
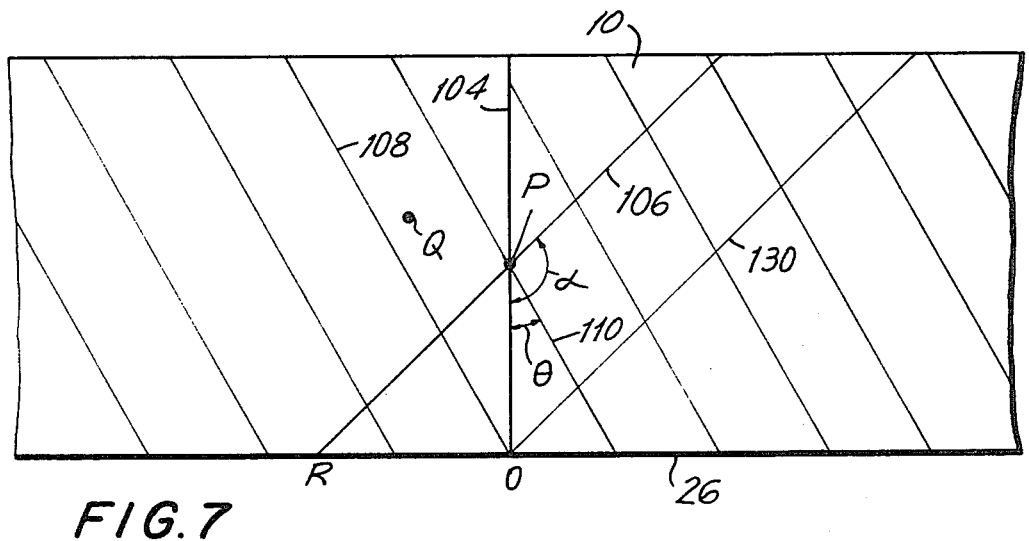
FIG. 7 is a plan view of a portion of the map or chart in the plotter of the present invention, and shows the geometrical relationships for setting the plotter.

The geometrical configuration for determining the Omega or Loran lines of position for a point P, as described above, is shown in FIG. 7. This same Figure is applicable to the reverse situation of positioning the indicator or marker 68 to a desired point P, if the Omega or Loran lines of position of point P are known. In the present example these are lines 106 and 110, each a member of a family marked on the chart 10.

If manual setting is desired, point P is first located approximately by estimating the intersection of the two given lines of position 106 and 110. The chart 10 is then moved by means of knobs 20 or 22, and indicator 68 is moved by means of knob 80 until indicator 68 coincides with such approximate location of point P. Since the readout of the plotter provides precise information of the Omega or Loran coordinates of the indicator as described in the previous paragraph, this indication is used for making appropriate correction by means of the knobs 20, 22, 80 until the position of the indicator 68 corresponds precisely to the two given lines of position 106 and 110. Such correction is likely to be needed in case the given lines of position fall between those marked on the chart, such as for point Q. If, on the other hand, automatic setting is to be performed in lieu of the manual setting, driving motors may be linked or connected to the knobs 20, 22 and 80. The motors may then be part of a servo-loop which moves the chart 10 and displaces the indicator or element 68 until the equations $$L\,110 = L\,108 + \overline{OP} \tan \theta$$

$$L\,106 = L\,130 + \overline{OP} \tan \alpha$$

are satisfied at the same time. Under these conditions sensors 90 and 94 read positions L130 and L108 respectively, the magnitude $\overline{OP}$ is indicated by potentiometer 112, and appropriate corrections are supplied by sensors 92 and 96. The values of the above equations are continuously calculated while chart 10 and indicator 68 are moved, and compared to the desired values L110 and L106. The driving motors cease operating when these values become equal. Servo-loops for this purpose, are well known in the art and are for this reason, not described here in further detail.

Figure 4:
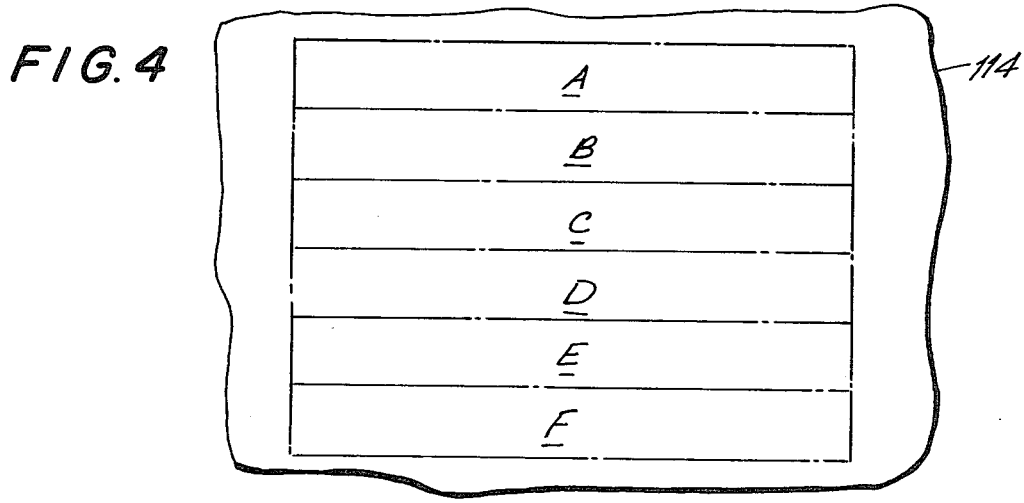
FIG. 4 is a plan view of a portion of the geographical map or chart covering an extended geographical area and subdivided into a plurality of frames for use in conjunction with the plotter of the present invention.
Figure 5:
FIG. 5 is a plan view of a chart in the plotter of the present invention, and shows the arrangement of transforming the vertical combination of frames in FIG. 4 into a horizontal combination suitable for transport between spools of the plotter.

If an extended geographical area is to be included on the chart 10 which has a substantially limited width, but may have many yards of length rolled up on spools 40 and 42, for example, the arrangement of FIGS. 4 and 5 may be employed. FIG. 4 illustrates how a substantially large surface may be subdivided into regions A to F, and these regions are then rearranged as shown in FIG. 5, so that they extend along the chart in a lengthwise direction. Each such section A to F may be considered a frame which may be displayed at a time by the plotter 18. The corners of these frames may then be identified with respective Omega or Loran lines of position, and such lines of positions at these corners may be sensed or detected by the sensor in the plotter to signal when the beginning or the end of a frame has been reached. Thus, when the indicator 68 is displaced to an extreme position on a frame, sensors 90 and 92 which read the respective lines of position for that extreme point on the frame, can provide a signal for advancing the chart to the next frame. Accordingly, by subdividing a map 114 with sections A to F arranged in vertical combination as shown in FIG. 4, a rearrangement of these sections or frames may be obtained to result in the horizontal combination of FIG. 5 which is adapted for use with the chart 10 of the present invention.

Figure 8:
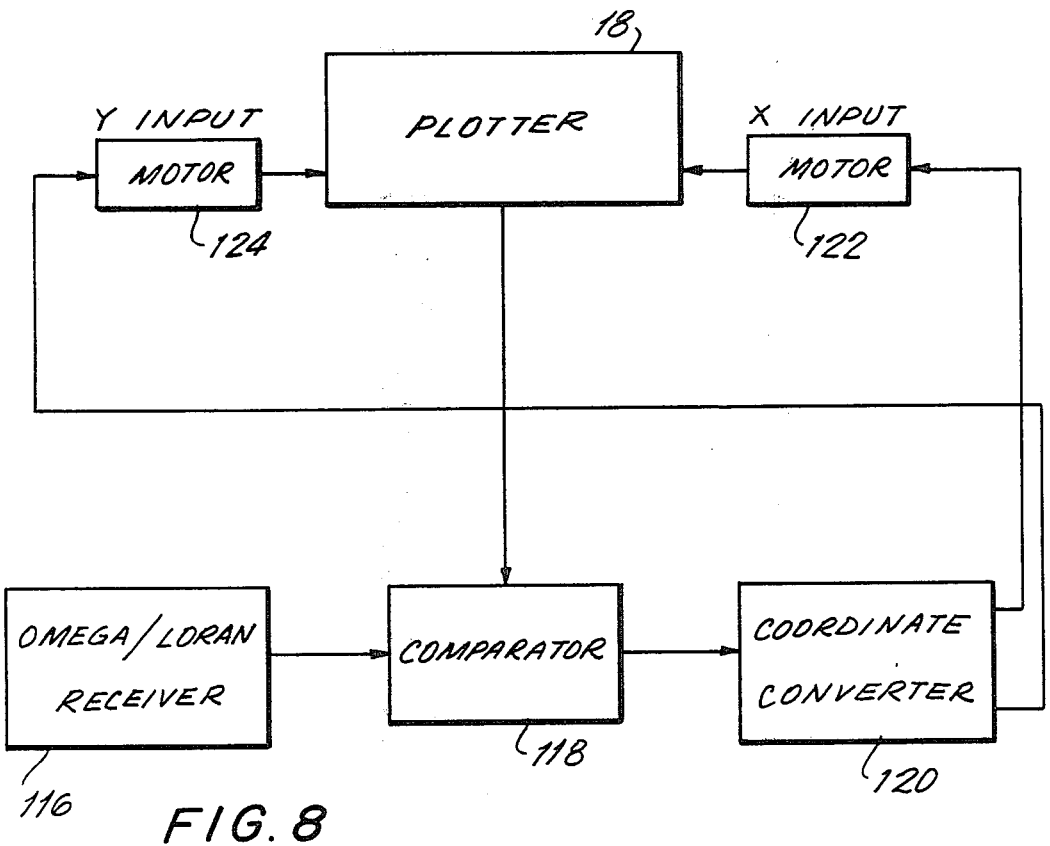
FIG. 8 is a schematic view of coordinate conversion arrangement useable in conjunction with the plotter of the present invention.

In another embodiment of the present invention, shown in FIG. 8, the plotter 18 is positioned automatically in accordance with data or information received from an Omega or Loran receiver 116. The position of the plotter 18, namely the indicator 68 and the displacement of the chart 10, are read by the sensors 90–96 and converted to $\Omega$ lines of position, for example, by substantially simple calculation. The calculated results are then compared to the information from the unit 116 by a comparator 118. The difference in positions between the plotter and the information provided by the receiver 116, is applied to a coordinate converter 120 which converts the Omega or Loran lines of position into corresponding x - y coordinates. The resultant x and y signals from the coordinate converter are applied to the drive inputs for the chart and the indicator 68, so as to position or displace these elements until the output of the comparator 118 is substantially zero. The output signals from the coordinate converter 120 are applied to motors 122 and 124. Motor 122 representing the displacement of the chart in the x direction, for example, may be connected to the shaft carrying the rotatable knobs 20 and 22. Similarly, motor 124 representing displacement of the indicator in the y direction, may be connected to the shaft carrying the knob 80.

The conversion of coordinates from Omega or Loran lines of position to x - y coordinates, as carried out by the converter 120, are well known in the art, and are consequently not described further in detail. At the same time, conversion of the x - y coordinates into corresponding magnitudes of latitude and longitude are also well known in the art, such computations may be carried out additionally if desired.

Whereas line 104 is shown to be substantially within the central area of the viewing surface 100, this line 104 together with the axis of the lead screw 60 may be displaced along substantially any desired location in that viewing surface, depending on the specific application of the plotter. At the same time, it is not essential that sensors 94, 96 be fixed along the axis of the lead screw 60. These sensors 94, 96 may also be displaced from this axis, as desired. Furthermore, in place of the spools 40 and 42, a sprocket arrangement may be provided in which sprocket wheels carried by the spool shafts 40 and 42, for example, engage sprocket holes in the chart along the sides thereof.

Figure 9:
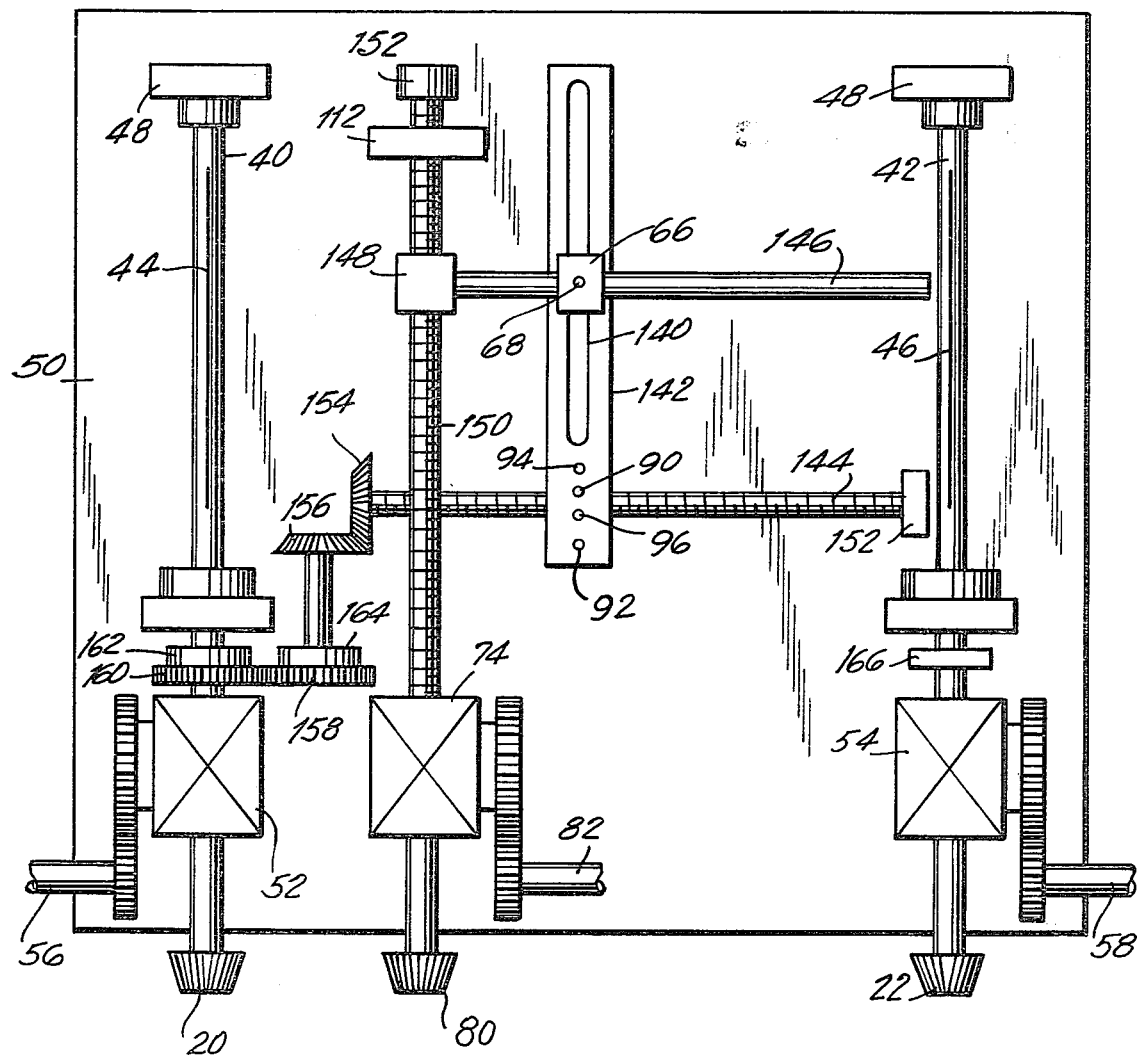
FIG. 9 is a schematic view of the mechanical linkages of another embodiment of the plotter.

In accordance with a further embodiment of the present invention, the indicator 68 is displaced in both X and Y directions, as shown in FIG. 9, when a particular frame of the chart 10 is displayed by the plotter. In this arrangement, the chart is transported between spools 40 and 42 until a desired frame of the chart appears within the display area of the plotter. Thereafter, the chart is held stationary, and the indicator 68 is displaced along the X-Y coordinates of the plotter. For this purpose, the support 66 for the indicator 68 rides within an elongated slot 140 of a bar-shaped member 142 carrying the sensors 90–96. The member 142, furthermore, has a threaded opening through which a lead screw 144 passes. Rotation of the lead screw 144 causes the member 142 to become displaced, thereby, along the transport direction of the chart, corresponding to the X-direction. The support 66 for the indicator 68 has, moreover, an opening through which passes a rod-shaped member 146 having a smooth surface. The rod-shaped member 146 is fastened to a block-shaped member 148 having a threaded opening through which lead screw 150 passes. Rotation of the lead screw 150, therefore, displaces the block member 148 along the axis thereof, and thereby displaces the indicator 68 along the Y-direction of the chart. The block member 148 may be displaced independently of the displacement of the member 142 along the lead screw 144. The free ends of the lead screws 144 and 150 are rotatably supported in bearings 152. Lead screw 144, furthermore, is linked to the output of the differential 52, by means of gear elements 154, 156, 158, 160.

When using the embodiment of FIG. 9, a clutch 162 coupling the output of differential 52 with the spool 40, is disengaged. Such disengagement of the clutch 162 is carried out after a desired frame of the chart 10 is displaced by the plotter. At the same time, clutch 164 coupling the output of differential 52 with the lead screw 144, becomes engaged. In view of such disengagement of clutch 160 to an engagement of clutch 164, settings of the knob 20 and navigational input 56 are transmitted to the lead screw 144, and not the spool 40. This arrangement, therefore, permits the indicator 68 to become displaced along the X-direction while the chart is held stationary. A further clutch 166 between the output of differential 54 and spool 42 is also disengaged simultaneously with the disengagement of clutch 162 for the purpose of transferring the X-displacement along the chart, to the indicator 68.

The clutches 162, 164, 166 may be of conventional electromagnetic or mechanical construction, for example.

When a chart is inserted into the plotter of the present invention, the information recorded on the strip 24 may be read or transferred into a computer by means of the sensors 90–96. The computer can then process the information and locate rapidly a desired frame of the chart, corresponding to given coordinates or lines of position. Similarly, when the indicator 68 becomes positioned along a border of a frame with motion which tends to move the indicator off the frame, the computers can rapidly indicate the proper frame to be displayed next by the plotter and allow the indicator to remain moveable within the display area of the plotter. Thus, the computer stores in memory the configuration of FIG. 4, described above, and then selects the appropriate frame of FIG. 5 to be displayed by the plotter to prevent the indicator 68 from becoming stopped against the border of a frame and thereby lose continuity in the path traced by the indicator 68.

The lead screws 60, 144 and 150 may be replaced by gear racks and pinions, and the differentials shown in FIG. 6 may be replaced, as desired, with a variety of summing devices and gear arrangements well known in the art. It is also to be understood that whereas embodiments have been described above in relation to the use of Omega and Loran systems, the plotter in accordance with the present invention, is adaptable to any one of the numerous possible systems which provide lines of position for fixing the location of a point, for example.

Figure 10:
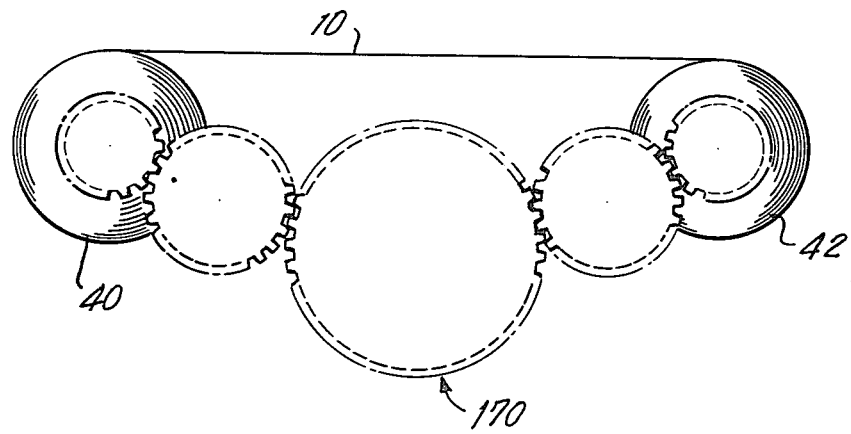
FIG. 10 is a front view of the arrangement for retaining the map or chart in taut condition when wound on rotary spools.

In accordance with a further advantageous feature of the present invention there is provided an arrangement for retaining the displayed map 10 in taut condition even though, as shown in FIG. 10, the spool 40 has a substantially larger diameter than the spool 42. Thus, when unwinding the rolled map 10 from the spool 40, one revolution of the spool 40 unwinds a greater length of map 10 than is wound onto the periphery of the spool 42 for one revolution of this spool 42. Accordingly, the excess length of the map not wound onto the spool 42 when both spools 40 and 42 are rotated through one revolution, for example, causes slackening and sagging of the map being displayed in the plotter.

For purposes of maintaining the map taut so that the map may be viewed with precision, there is provided, in accordance with the present invention, that the spools 40 and 42 are linked by means of intermediate gears 170, so that the rotations of spools 40 and 42 are in a 1:1 ratio, whereby one revolution of the spool 40 results in one revolution of the spool 42. Mounted on the spool 42, furthermore, is a sleeve 172 which is freely rotatable with respect to the spool 42. The map 10 is wound onto this sleeve 172. A spring 174 (FIG. 11) passes over one end of the spool 42 and has one of its ends 176 connected to this spool. The other end 178 of the spring 174 is connected to the sleeve 172.

In operation of the arrangement for maintaining the map in taut condition, when the spool 40 is rotated through a single revolution, the spool 42 is rotated through a single revolution also and in the same direction. The spring 174 is wound on the spool 42 so that it tends to urge sleeve 172 to rotate an additional amount in the same direction. Thus, when spool 40 is rotated to unwind map 10, and spool 42 is rotated in the same direction to wind the map on its peripheral surface, the spring 174 rotates the sleeve 172 an additional amount in the same direction to maintain the map taut. The spring 174 functions thereby as a means for compensating for the differences in the peripheral diameters of the spools 40 and 42.

The spring 174 is required to include sufficient turns to compensate for the difference in angular rotation necessary to keep the map taut in passing from one spool to the other. Such required number of turns on the spring 174 is well within reasonable construction for such a spring when considering, for example, that a 50 foot long roll of map material having a thickness of 0.010 inches, occupies approximately 75 turns on a 2 inch diameter roll. For such an arrangement, the maximum number of turns required for the spring to compensate for the difference in rotations is 9 turns.

In addition to retaining the map in taut condition, the spring 174 also serves as a means of avoiding the effects of back-lash present in the interconnecting gears. At the same time, the gearing 170 used for linking the spools 40 and 42, may be replaced by suitable belt means.

Figure 11:
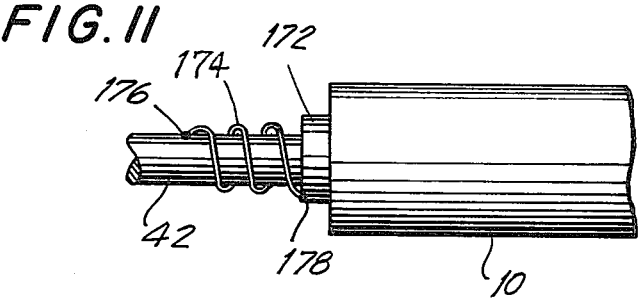
FIG. 11 is a side view and shows the spring construction in the arrangement of FIG. 10.
Figure 11A:
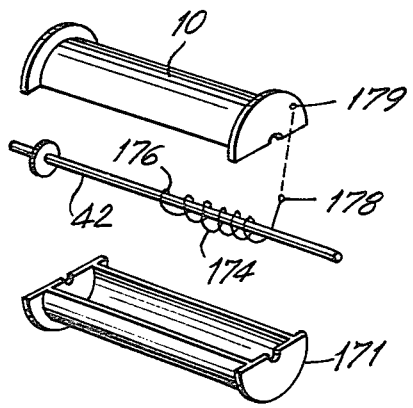
FIG. 11a is a perspective view of another embodiment of the construction of FIG. 11.

In a particularly compact construction of the arrangement of FIGS. 10-11, the spring 174 is located along the axis of spool member 42, and surrounded by the map 10 when wound on the spool, as shown in FIG. 11a. For purposes of illustration, FIG. 11a is shown as an exploded view in which a split shell 171 is freely rotatable on spool member 42 and carries the map 10. The end 178 of spring 174 is fastened to a pin 179 on shell 171. The shell functions similar to sleeve 172 and is shown in split form mainly to simplify illustration. The shell 171 may be constructed as an integral member.

In accordance with a further advantageous embodiment of the invention, the map 10 is provided with information on both sides of the rolled material. Thus, when viewing the rolled map in FIG. 12, there is provided information on the top surface of the rolled material, as well as on the under side thereof. This arrangement allows for increasing the amount of information carried by a roll or spool, and also permits pages of a book, which are printed on both sides, for example, to be joined in a continuous strip or roll suitable for use in the plotter of the present invention.

Figure 12:
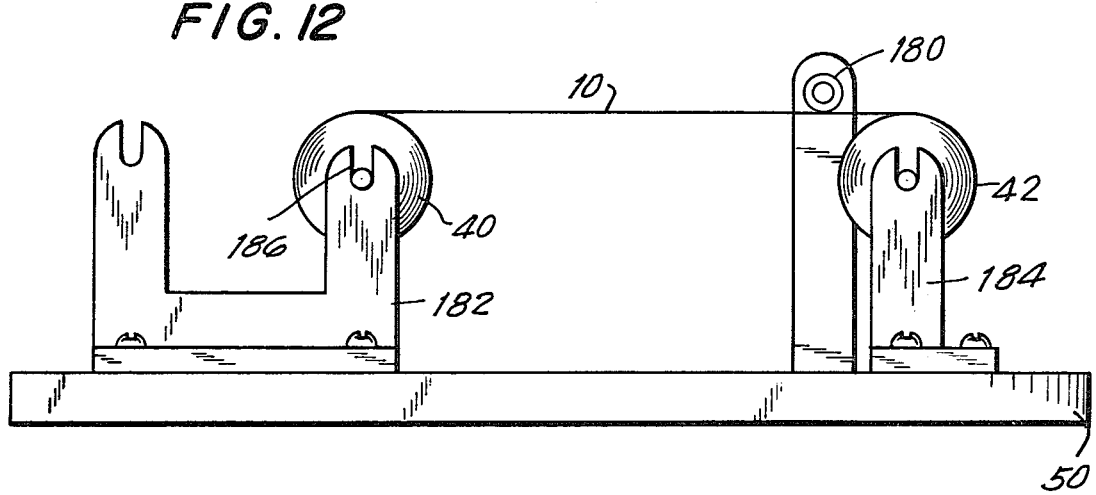
FIG. 12 is a front view of an arrangement for reversing the viewing side of the chart.
Figure 13:
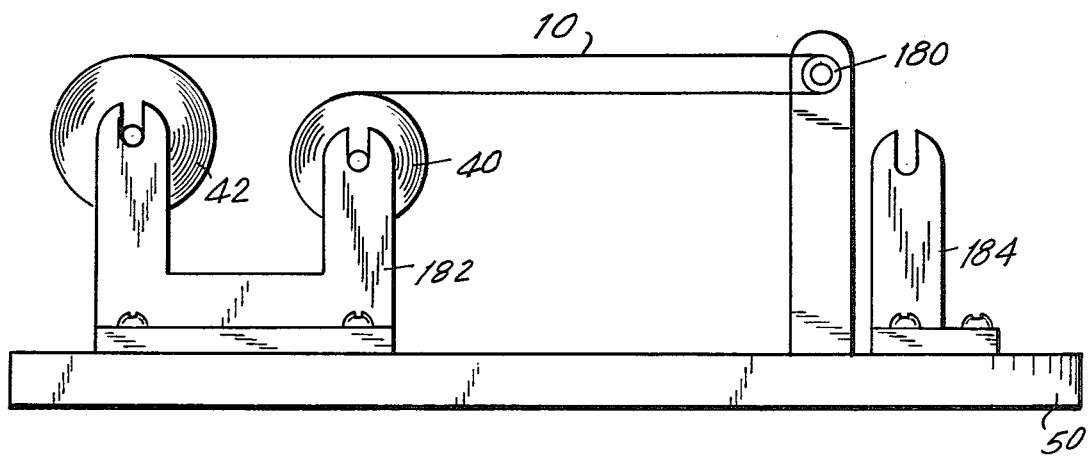
FIG. 13 is a view of FIG. 12 after the viewing side of the chart or map has been reversed.

In viewing the information on the top surface of the roll carrier, the spools are operated in the manner discussed above. For purposes of viewing the underside of the rolled carrier, however, there is provided a roller 180 which is in contact with the top surface of the rolled carrier as shown in FIG. 12, and which is supported between the internal walls of the plotter housing. The roller 180 is freely rotatable as the map moves between spools 40 and 42, and is in contact therewith. The spool 40 is supported, furthermore, by a bracket 182 having two bearing arms. To reverse the surface of the map displayed by the plotter, the spool 42 is removed from its normal bearing bracket 184, and is placed into the second arm of the bracket 182 as shown in FIG. 13. In moving spool 42, in this manner, the map is wound about the roller 180, as shown in FIG. 13, whereby the under side of the rolled carrier in FIG. 12 becomes the top surface when in the position of FIG. 13. Thus, both sides of the rolled carrier of the map may be viewed conveniently by moving one of the spools from one of the bearing brackets to the other. The bearing bracket 184, at the same time, may be constructed identical with the bracket 182, so that either one of the spools may be selectively moved as desired. The bearing brackets 182, 184 may also be provided with simple elongated slots 186 which permit the shafts of the spools to be dropped readily into the bearing brackets. An additional roller such as the element 180 may also be provided, thereby, adjacent to the bracket 182 to permit either one of the spools to be moved for purposes of reversing the surface of the rolled carrier to be used.

Figure 14:
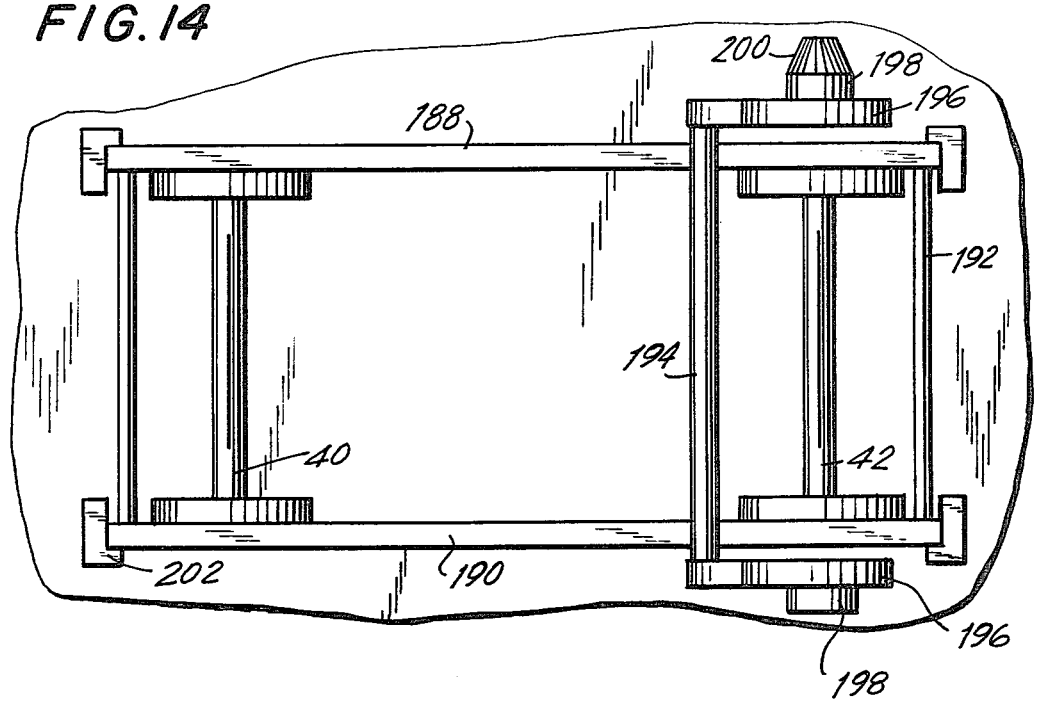
FIG. 14 is a plan view and shows the construction of another embodiment for reversing the viewing side of a chart or map.
Figure 15:
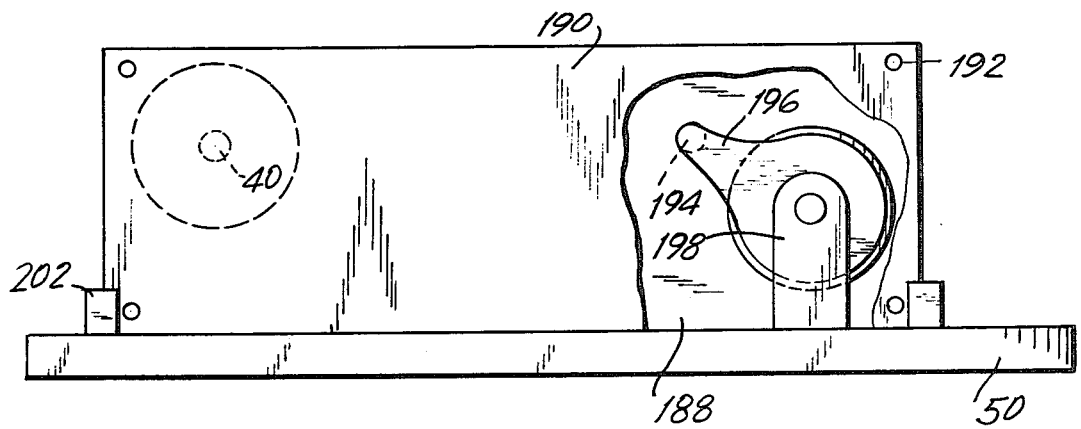
FIG. 15 is a front view of the arrangement of FIG. 14, with parts broken away.

The reversal of the side of the rolled carrier may also be achieved through the construction shown in FIG. 14. In this arrangement of the present invention, the spools 40 and 42 are mounted within a removable cartridge having walls 188 and 190 interconnected by rods 192. The walls 188 and 190 of the cartridge are bridged or straddled by a roller 194 supported between rotatable arms 196. The arms 196 are supported in bearings 198 on the outside of the walls 188 and 190. The arms 196 are spaced from these walls 188, 190, and they may be rotated independent of the position or displacement of the cartridge with the walls 188, 190. A turning knob 200 is provided on one of the arms 196 to facilitate rotation thereof. As shown in FIG. 15, the cartridge is held in place on the base plate 50 by means of retaining elements 202 which permit the cartridge to be lifted vertically from the base plate 50, and turned 180° so that the bottom sides of the walls 188, 190 in contact with the base plate 50 become top sides after turning of the cartridge.

Figure 16:
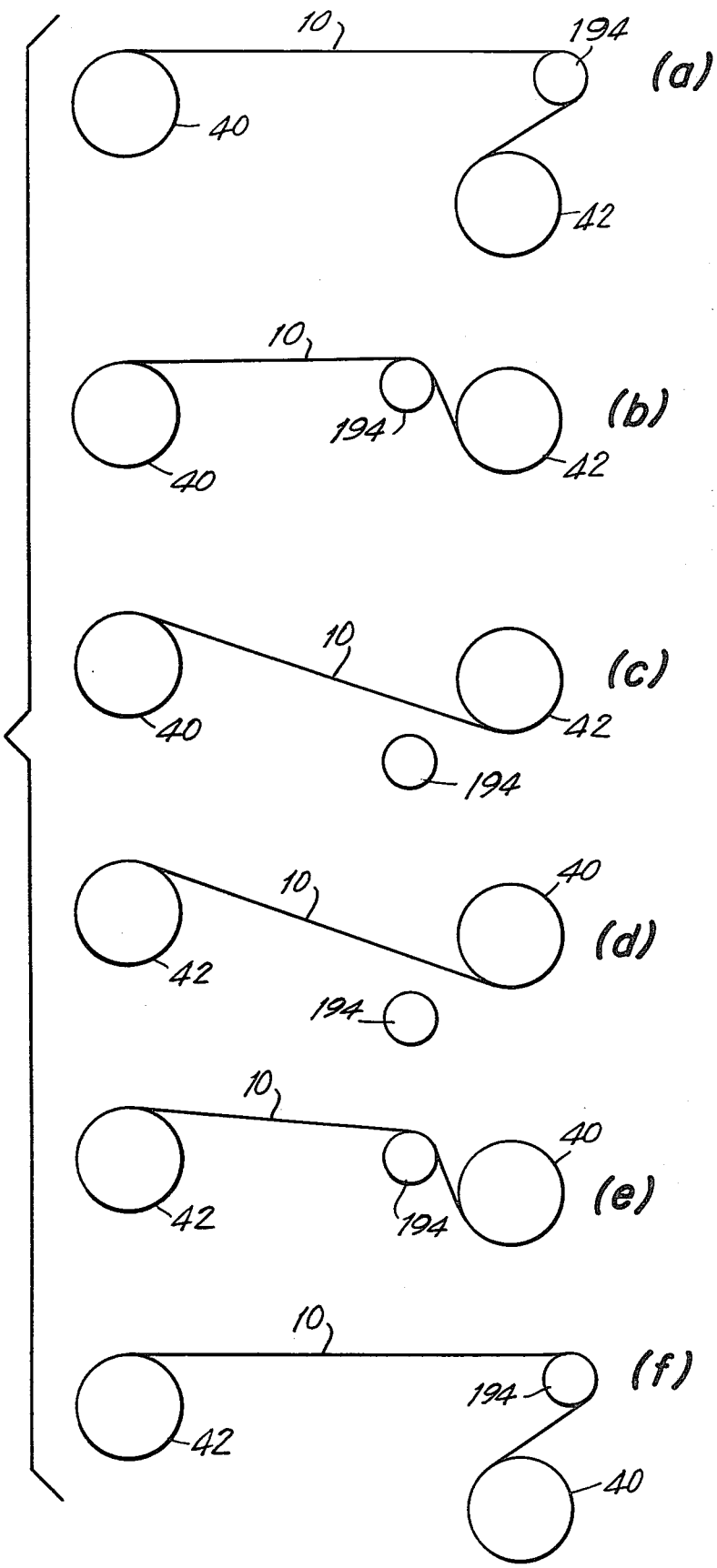
FIG. 16 is a schematic view of progressive positions of elements taken in the operation of the construction of FIGS. 14 and 15.

In the operation of the construction of FIGS. 14 and 15, the spools 40 and 42 are mounted in the cartridge in the relative positions shown schematically in FIG. 16a. The map 10 wound on spools 40 and 42, is passed over the roller 194 as shown in FIG. 16a. To provide for reversal of the sides of the map 10, the roller 194 is moved by the arm 196 from the position shown in FIG. 16a, to the position of FIG. 16b, and thereafter to the position of FIG. 16c. In FIG. 16c, the roller 194 is no longer in contact with the map 10, and the latter is inclined with respect to the horizontal, as shown. The roller 42 is also mounted in the cartridge, substantially below the roller 40. After attaining the configuration of FIG. 16c, the cartridge is turned 180° as described above, so that the configuration of FIG. 16d results. The roller 194 is then moved by the arms 196 from the position of FIG. 16d to the position of FIG. 16e, and finally to the position shown in FIG. 16f. In this final position in FIG. 16f, the top viewing surface of the map is reversed, and is again horizontal within the plotter.

Figure 17:
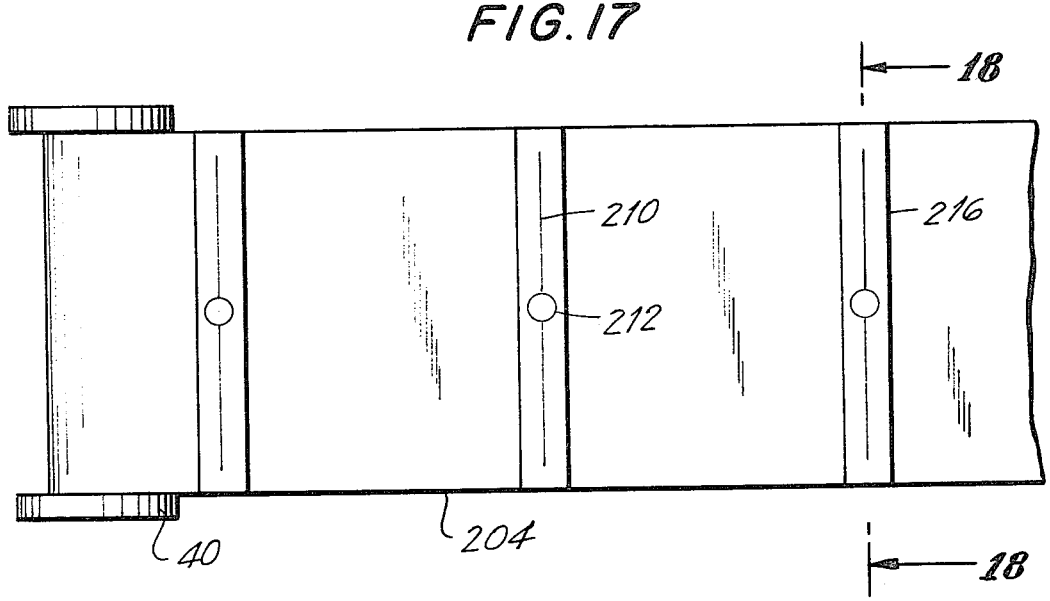
FIG. 17 is a plan view of a carrier for holding sections of a map or chart within pockets formed by superimposed transparent plastic strips.
Figure 18:
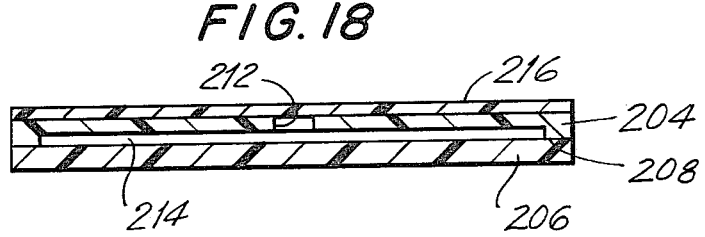
FIG. 18 is a sectional end view taken along line 18—18 in FIG. 17.

FIGS. 17 and 18 show an arrangement in which the rolled carrier for the map is constructed in the form of two plastic transparent sheets 204 and 206 sealed together at their longitudinal edges 208. The top plastic sheet or strip 204 is provided, furthermore, with slits 210 spaced at regular intervals along the length of the strip. A perforation 212, moreover, is provided along the length of the slit 210, and passing through the top plastic strip 204. This arrangement of the rolled carrier allows for holding sections of a map spaced from each other along the length of the rolled carrier. Thus, pages of a book for example, may be taken and inserted through the slits 210 so that they become held between the plastic strips 204 and 206.

After insertion of such map sections 214 within the free space between the plastic strips 204, 206, the slits 210 may be sealed by means of transparent tape 216, similar to conventional self-adhesive transparent tape. Furthermore, by applying pressure on the tape 216 over the perforations 212, the tape may be applied directly to the map sections 214, so that these become held in fixed relative positions between the plastic strips 204, 206. The perforations 212 may be in the form of circular, square-shaped openings or rectangular-shaped openings, for example. Furthermore, several perforations may be provided along the length of each slit.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plotter comprising, in combination, a frame; a chart movable in predetermined directions; means for movably supporting said chart; means on said chart for recording intersections of predetermined spaced lines with a common line; means cooperating with said recording means for reading said recorded intersections; spool means for winding said chart thereon; said spool means comprising two spools spaced from each other; means for transporting said chart between said spools; and means for maintaining said chart taut while being transported between said spools and comprising means freely rotatable on one of said spools and carrying the portion of the chart wound on said one spool, spring means with one end connected to said one spool and with the other end connected to said means freely rotatable on said one spool, said spring means being free of connection to said frame, said freely rotatable means being connected to said one spool through said spring means, and means linking said two spools so that when one spool is rotated through a predetermined amount of rotation the other spool is rotated directly by said linking means through said predetermined amount of rotation.

2. The plotter as defined in claim 1 including means movable in a direction perpendicular to said predetermined direction of said chart for forming a rectangular set of coordinates with the movement of said chart.

3. The plotter as defined in claim 1 wherein said spaced lines comprise geographical lines of position.

4. The plotter as defined in claim 3 wherein said lines of position comprise Omega lines of position.

5. The plotter as defined in claim 3 wherein said lines of position comprise Loran lines of position.

6. The plotter as defined in claim 1 wherein said recording means on said chart for recording said intersections comprises magnetic recording means.

7. The plotter as defined in claim 1 wherein said recording means on said chart for recording said intersections comprises means with punched holes.

8. The plotter as defined in claim 1 including transverse movable means for moving in a direction perpendicular to said predetermined direction of motion of said chart; means for driving said chart in said predetermined direction and said transverse movable means in a direction perpendicular thereto; communication receiver means for receiving lines of position of a predetermined point; comparator means connected to said communication receiver means for comparing said lines of position from said receiver means with the position of the point determined by the intersection of said predetermined direction of said chart and the direction of movement of said transverse movable means; and coordinate converter means between said comparator means and said driving means for moving said chart and said transverse movable means until the position of the point in the plotter determined by said perpendicular direction is substantially equal to the position obtained from said communication receiver.

9. The plotter as defined in claim 1 wherein said chart is comprised further of a plurality of sections adjacent to each other and sequentially positioned along said predetermined direction of motion of said chart, said plurality of sections when placed in said sequence along a direction perpendicular to said predetermined direction of said chart and adjacent to each other, forming a predetermined geographical area.

10. The plotter as defined in claim 1 including transverse movable means for moving in a direction perpendicular to said predetermined direction of said chart; and longitudinal movable means for moving along said predetermined direction of said chart when said chart is stationary.

11. The plotter as defined in claim 1 wherein said chart comprises two transparent strips of material sealed together at their longitudinal edges; slit means on one of said transparent strips for passing therethrough sections of an information carrier to be held between said transparent strips; and means for sealing said slits, said slits having at least one perforation along the length of said slit and exceeding the opening width of said slit.

12. The plotter as defined in claim 1 wherein said chart comprises an elongated carrier having spaced pockets for holding sections of information carrying means.

13. A plotter as defined in claim 1 including means movable in a direction perpendicular to said predetermined direction of said chart for forming a rectangular set of coordinates with the movement of said chart; said spaced lines comprising geographical lines of position; said lines of position comprising Omega lines of position; said recording means on said chart for recording said intersections comprising magnetic recording means; transverse movable means for moving in a direction perpendicular to said predetermined direction of motion of said chart; means for driving said chart in said predetermined direction and said transverse movable means in a direction perpendicular thereto; communication receiver means for receiving lines of position of a predetermined point; comparator means connected to said communication receiver means for comparing said lines of position from said receiver means with the position of the point determined by the intersection of said predetermined direction of said chart and the direction of movement of said transverse movable means; coordinate converter means between said comparator means and said driving means for moving said chart and said transverse movable means until the position of the point in the plotter determined by said perpendicular direction is substantially equal to the position obtained from said communication receiver; said chart comprising further: a plurality of sections adjacent to each other and sequentially positioned along said predetermined direction of motion of said chart, said plurality of sections when placed in said sequence along a direction perpendicular to said predetermined direction of said chart and adjacent to each other, forming a predetermined geographical area; said chart comprising an elongated carrier having spaced pockets for holding sections of information carrying means and having two transparent strips of material sealed together at their longitudinal edges; slit means on one of said transparent strips for passing therethrough sections of an information carrier to be held between said transparent strips; and means for sealing said slits, said slits having at least one perforation along the length of said slit and exceeding the opening width of said slit.

* * * * *